United States Patent [19]
Jensen

[11] Patent Number: 5,861,206
[45] Date of Patent: Jan. 19, 1999

[54] PREMANUFACTURED COVERING CONSISTING MAINLY OF THERMOPLASTIC MATERIALS FOR ROADS, PARKING AREAS, ETC

[75] Inventor: Hans Falkner Jensen, Denton, N.C.

[73] Assignee: Cleanosol International AB, Sweden

[21] Appl. No.: 745,295

[22] Filed: Nov. 8, 1996

[30] Foreign Application Priority Data

Feb. 19, 1996 [SE] Sweden .................................. 96005962

[51] Int. Cl.$^6$ ................................ B32B 3/00; G01K 1/02
[52] U.S. Cl. ........................ 428/143; 428/155; 428/156; 428/172; 428/206; 428/913; 404/14; 404/16; 374/162; 116/207; 116/217
[58] Field of Search ............................ 374/162; 116/216, 116/207, 217; 428/913, 156, 172, 143, 29, 87, 95, 155, 167, 206, 402; 404/9, 13, 14, 16, 22

[56] References Cited

U.S. PATENT DOCUMENTS

| 4,070,912 | 1/1978 | McNaughten et al. | 73/356 |
|---|---|---|---|
| 4,188,437 | 2/1980 | Rohowetz | 428/199 |
| 4,428,321 | 1/1984 | Arens | 426/88 |
| 4,459,046 | 7/1984 | Spirg | 374/162 |
| 5,152,611 | 10/1992 | Pieper et al. | 374/160 |
| 5,352,649 | 10/1994 | Shibahashi et al. | 428/324 |

*Primary Examiner*—Donald Loney
*Attorney, Agent, or Firm*—Lerner, David, Littenberg, Krumholz & Menltik

[57] ABSTRACT

The invention relates to a premanufactured covering which mainly consists of a thermoplastic material and which covering is intended for roads, parking areas, etc. The covering has reflective material, friction material or the like on the intended upward surface. The covering according to the invention is characterized in that the material includes a visible temperature indicator when being applied.

6 Claims, No Drawings

PREMANUFACTURED COVERING CONSISTING MAINLY OF THERMOPLASTIC MATERIALS FOR ROADS, PARKING AREAS, ETC

TECHNICAL FIELD

The present invention relates to a premanufactured covering which consists mainly of thermoplastic materials and which is intended for roads, parking areas, etc. Such coverings are usually provided with reflective materials and friction materials, etc. on the surface. These materials may be applied and easily fastened at the surface during the manufacturing process or they can be strewn on the molten surface after the application of the covering on the support.

PRIOR ART

Premanufactured coverings of thermoplastics are previously known. They are used for marking on roads, parking areas, etc. and they are punched or cut out to premanufactured lines, symbols, etc. which are arranged on a support of typically asphalt and heated by an external heat source so that the material melts and obtains such a fluidity that it adheres to the support. The covering material is usually produced by extruding a web on a rolling support from a melt which is passed out through a nozzle. While the web still is hot glass beads, friction agents, etc. are strewn thereon and adhere to the still molten surface. Sometimes these agents are strewn on the surface after the covering has been put on its place and warmed up.

Examples of such thermoplastic coverings are disclosed in the British patent 2030586, the German patents 2317936 and 2831386 and the European patent specification 41335. These known coverings consist of thermoplastic material such as polypropylene, PVC, polystyrene or polyisobutylene together with rubber-forming agents, plasticizers, pigments and fillers. They may be reinforced by glass fibres, metal threads or metal foils.

To apply these premanufactured coverings on streets, parking areas, airports, or the like special machines may be used but it is also usual that the premanufactured coverings, which exist in the shape of straight lines, symbols, etc., are applied by hand directly on the support and the material is heated by an external heat source which may be a flame from a propane flame or the like. The adhesion to the support is dependent on the heating of the material so that in a molten state it can penetrate the surface of the support and, in some cases, melt together with this.

TECHNICAL PROBLEM

When a premanufactured thermoplastic covering of the above kind shall be applied and melted so that it adheres to the support, the problem will always arise that the operator does not know exactly when the heating shall be interrupted and at what temperature of the material this shall be done. If the covering material is heated too much it may be oxidised and discoloured and the material lying thereon, which for example consists of glass beads and/or friction particles, may sink too far down in the covering material so that its function is substantially reduced. If on the other hand, the heating is insufficient, these particles will not sink down sufficiently into the covering surface to adhere thereto. Moreover, in the case of insufficient heating the adhesion to the surface will be too poor. If the glass beads and the other particles on the surface are not allowed to sink down into the covering to a desired degree, they will be rapidly worn off from the surface. These different circumstances require good knowledge of the material and temperature control to obtain a good result.

SOLUTION

It has therefore long been a desire to know when the heating shall be interrupted during application of premanufactured coverings according to the above and the present invention has therefore achieved a premanufactured covering which consists mainly of thermoplastic material for roads, parking areas, etc. having reflective material, friction material, etc. on or in the intended upper surface which covering is characterised in that the material includes a visible temperature indicator on the covering.

According to the invention, it is suitable that the temperature indicator consists of geometric deformations in the surface such as scores, punched patterns or the like.

According to the invention, it is also possible to admix one or more colour indicator which changes colour at a certain temperature.

The geometric deformations in the surface according to the invention should have such a depth that they are substantially levelled out when the desired temperature in the thermoplastic material has been obtained.

According to the invention, the underside of the thermoplastic covering should have obtained such a consistency that it adheres to the support when the geometric deformations are levelled out and the desired temperature has been obtained.

The reflective materials, the friction materials, etc. should, according to the invention, have sunk down into the material to a depth of 20–80% of their volume when the geometric deformations mainly have been levelled out.

GENERAL DESCRIPTION

The geometric deformations in the surface can be of different kinds. They may consist of a pattern of short punched lines placed perpendicularly to each other, of dot-shaped impressions placed after each other in a row which are repeated along a track or they may have some other optional form. The deformations can also be cut in the shape of scores or made in another way. What is important with the deformations in the surface is that they shall have a suitable depth and shape so that the desired temperature and the effect are obtained when they have been substantially levelled. These parameters change from material to material and are also dependent on the thickness of the material web. A usual thickness of the material web may be 2–3 mm and the deformations should then have a depth of slightly more than 1 mm.

Examples of thermoplastic materials used according to the present invention may be:

| | |
|---|---|
| C5 hydrocarbon resins | 12% |
| Refined mineral oil | 3% |
| EVA | 3% |
| Glass beads | 30% |
| Titanium dioxide | 10% |
| $CaCO_3$ | 42% |

The reflective material which is used according to the present invention may be a retroreflective material which consists of glass beads and has a size of 0.1–2 mm. These are well known and they are manufactured by, for example, Potters, Swarco. The friction particles, which also is a known material may consist of, for example, Luxovit.

The invention is not limited to the above-mentioned embodiments but can be varied in different ways within the scope of the claims.

I claim:

1. A pre-manufactured surface covering comprising:

thermoplastic material for application to a paved surface by heating said thermoplastic material to a predetermined temperature at which said thermoplastic material adheres to said paved surface;

said thermoplastic material including a road marker including road marking material selected from the group consisting of reflective materials or friction materials, and a visible temperature indicator, whereby during heating of said thermoplastic material to apply said road marking material to said paved surface said predetermined temperature may be visibly indicated.

2. The pre-manufactured surface covering of claim 1 wherein said visible temperature indicator comprises at least one geometric deformation disposed in the surface of said thermoplastic material.

3. The pre-manufactured surface covering of claim 2 wherein said at least one geometric deformation comprises score lines or patterns on said surface of said thermoplastic material.

4. The pre-manufactured surface covering of claim 1 wherein said visible temperature indicator comprises color indicators, said color indicators changing color at said predetermined temperature.

5. The pre-manufactured surface covering of claim 2 wherein said surface deformation has a predetermined configuration, whereby said surface deformation substantially disappears at said predetermined temperature.

6. The pre-manufactured surface covering of claim 1 wherein said road marking material is disposed on the surface of said thermoplastic material, and wherein said road marking material has entered into said thermoplastic material to a depth of between 20 and 80% of its volume at said predetermined temperature.

* * * * *